Mar. 6, 1923. 1,447,570

W. H. POWELL

SYSTEM OF CONTROL OF ELECTRICAL CIRCUITS

Filed Apr. 22, 1918

Inventor
W. H. Powell
by
Attorney

Patented Mar. 6, 1923.

1,447,570

UNITED STATES PATENT OFFICE.

WILLIAM H. POWELL, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

SYSTEM OF CONTROL OF ELECTRICAL CIRCUITS.

Application filed April 22, 1918. Serial No. 233,582.

*To all whom it may concern:*

Be it known that WILLIAM H. POWELL, a citizen of the United States of America, residing at Milwaukee, in the county of Milwaukee and State of Wisconsin, has invented a certain new and useful Improvement in Systems of Control of Electrical Circuits, of which the following is a specification.

This invention relates to systems of control of electrical circuits applicable, for instance, to dynamo-electric machines of the type known as booster rotary converters.

It is known that in machines of that and similar types a change in the auxiliary machine from a boosting to a bucking condition or a change in degree of boosting or bucking, will cause changes in the armature reaction of the main machine. One of the objects of the invention is to provide for the control of these variations in armature reaction.

Another object of the invention is the provision of a controlling means which will compensate for variations in voltage applied to said controlling means.

Another object of the invention is to provide for compensation for the difference between the characteristic curves of the various field windings controlled.

Another object of the invention is to reduce the controlling means to a very simple form. Other objects will appear hereinafter as the description of the invention proceeds.

The novel features of the invention will appear from this specification and the accompanying drawings which form a part thereof and will be particularly pointed out in the appended claims.

Figure 1:
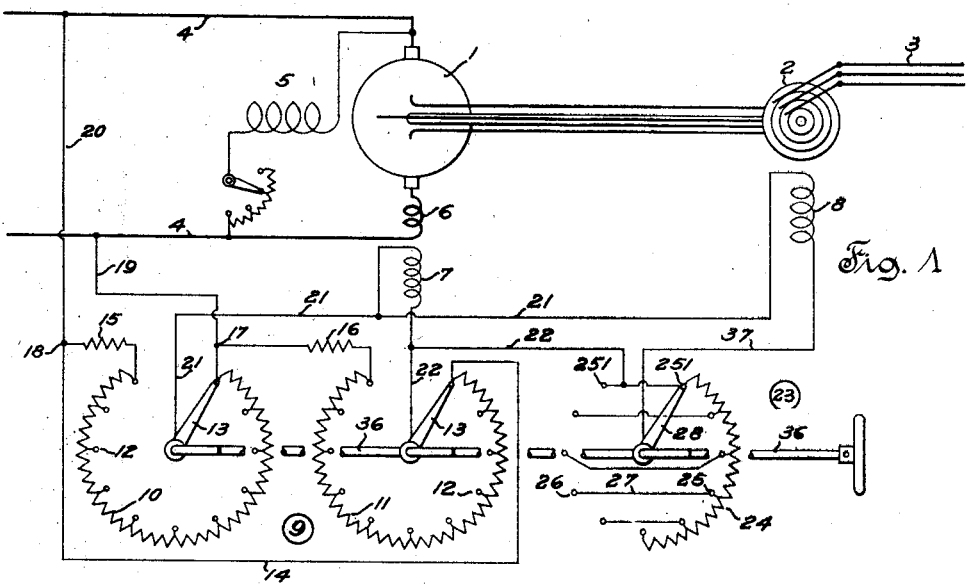
Fig. 1 is a diagram showing the invention as applied to a synchronous booster rotary converter.

In Fig. 1 is shown an armature 1 of a rotary converter having connected in series therewith an armature 2 of a synchronously driven booster. Alternating current is supplied through the three phase mains 3 and direct current is delivered by the armature of the converter through the mains 4. The converter is provided with a main field 5 (the current in which may be regulated by the usual rheostat) and a series interpole commutating field 6. A shunt interpole commutating field 7 is also provided. The booster 2 is provided with a field 8.

For the purpose of controlling the booster field and the shunt interpole field, what will be termed a reversible potentiometer rheostat 9, is provided. This rheostat comprises two main resistors 10, 11. These resistors are provided with taps and contacts 12 of any desirable number. Movable contact arms 13 are provided for coacting with the resistor contacts 12. The contact arms 13 are preferably mechanically coupled by any means such as a shaft 36. The main resistors 10, 11, are adapted to be connected as a closed loop by means of the fixed resistors 15, 16, and the conductor 14 which latter is preferably of low resistance. The points 17, 18 of connection between fixed resistor 16 and main resistor 10, and between fixed resistor 15 and main resistor 11, respectively, are connected to the direct current mains 4 by means of the conductors 19, 20, respectively. The shunt interpole field 7 is connected to be fed by conductors 21, 22 which respectively lead from the contact arms 13. The booster field 8 may be connected to be fed in the same way and may have a booster field rheostat 23 connected in series therewith, the purpose of which will be hereinafter described.

This booster field rheostat 23 comprises a resistor 24 provided with taps and contacts 25 of any desirable number, each of the contacts 25 being connected to the corresponding contact 26 arranged directly opposite, by means of the cross conductor 27. One terminal of the coil 8 is connected to the conductor 21 while the other is connected to the conductor 37, which latter is in turn connected to the movable contact arm 28 of the booster field rheostat 23. The initial contacts 25', 25', of that rheostat are connected to the conductor 22.

Figure 3:
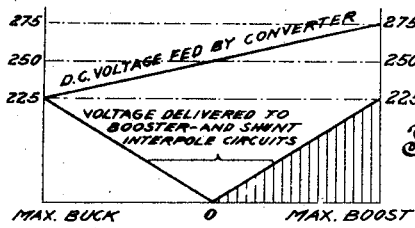
Fig. 3 is a graphical showing of certain voltage variations.

The operation of the system shown in Fig. 1 is as follows. With the contact arms 13 in the position shown, the booster field 8 is arranged so that the booster will be producing its maximum bucking effect. Assuming that the voltage range of the booster is 50 volts, being divided between 25 volts buck and 25 volts boost, and that when the booster 2 is neither bucking nor boosting the voltage supplied at the mains 4, 4, is 250 volts, the voltage supplied at points 17, 18, under conditions of maximum buck will be 225 volts. Inasmuch as the contact arms 13 are in effect, in the position shown, respectively connected directly across the points 17, 18, both the booster field and the shunt interpole field will have 225 volts impressed thereon. Inasmuch as the booster is, under these conditions, running as a motor and increasing the generator armature reaction of the rotary 1, the shunt interpole coil 7 is so arranged as to assist the series interpole coil 6, to compensate for armature reaction and provide a proper commutating field. If the contact arms 13 are now rotated in a clockwise direction by any suitable means, the voltage across these arms will gradually decrease inasmuch as points of equal potential are being approached. The result is that the voltage across both the booster field 8 and the shunt interpole field 7 is accordingly decreased to zero. At that time the arms 13 will be somewhere about midway between the ends of the resistors 10, 11. As the contact arms 13 are rotated still farther in a clockwise direction, the electromotive force across the same reverses its direction and as the rotation is continued, gradually increases. The booster now operates as a generator tending to cause a motor armature reaction in the rotary which is taken care of by the fact that the current in the shunt interpole coil 7 has now been reversed and produces a field opposing the field produced by the series interpole coil 6. It will be apparent that if no other means were provided and the arms 13 were rotated to the last contact in a clockwise direction that, inasmuch as 275 volts are now impressed at points 17, 18, more than a desired quantity of current would be supplied through the booster field 8 and the shunt interpole field 7. To obviate this result the fixed resistors 15, 16, are provided. These resistors are made of such value that a total drop of 50 volts takes place therein and thus reduces the voltage which may be impressed across the contact arms 13, when they have been moved to a position of maximum boost, to 225 volts. It will be seen that with this system the voltage delivered across the conductors 21, 22, may be varied without the use of additional rheostats from 225 volts, for example, in one direction of electromotive force, gradually reducing the voltage to zero, and then raising the voltage to 225 volts in the opposite direction of the electromotive force, while the voltage fed at the points 17, 18 changes, for example, from 225 to 275. These conditions are graphically shown in Fig. 3 which is self-explanatory. For convenience, the shaded portion has been turned into the positive quadrant.

It sometimes occurs that the characteristic curves of the shunt interpole field 7 and the booster field 8 are not the same so that as increasing or decreasing potentials are applied thereto, different increments or decrements of flux will be produced. If, for example, the same small potential is applied to the booster and shunt interpole fields and the potential is increased, the increments of flux produced in the booster field may become smaller and smaller because of the decreasing slope of the characteristic curve of magnetization, and this slope may be less than that of the shunt interpole field. It is therefore necessary to increase the potential applied to the booster field, under such circumstances, more than it is increased in the case of the shunt interpole field to get similar increments of field strength; and conversely as the potential decreases from a high value, it is necessary to decrease the potential applied to the booster field more than on the shunt interpole field. Such a difference in characteristic curves of the two fields may be compensated for by a rheostate 23, the movable contact arm 28 of which is placed in such a position that with the contact arms 13 in the position of maximum buck no resistance is inserted in the booster field. As the voltage across the conductors, 21, 22, is decreased by reason of a clockwise rotation of the contact arms 13, more and more resistance is inserted by the contact arm 28 until the same has reached the last contact connected to the resistor 24. As the voltage across the booster field is then gradually raised in the reverse direction, the resistance is again gradually removed by reason of the contact arm 28 making contact progressively with the contacts 26, until all of the resistance has again been removed when the contact 25 is reached.

Figure 2:
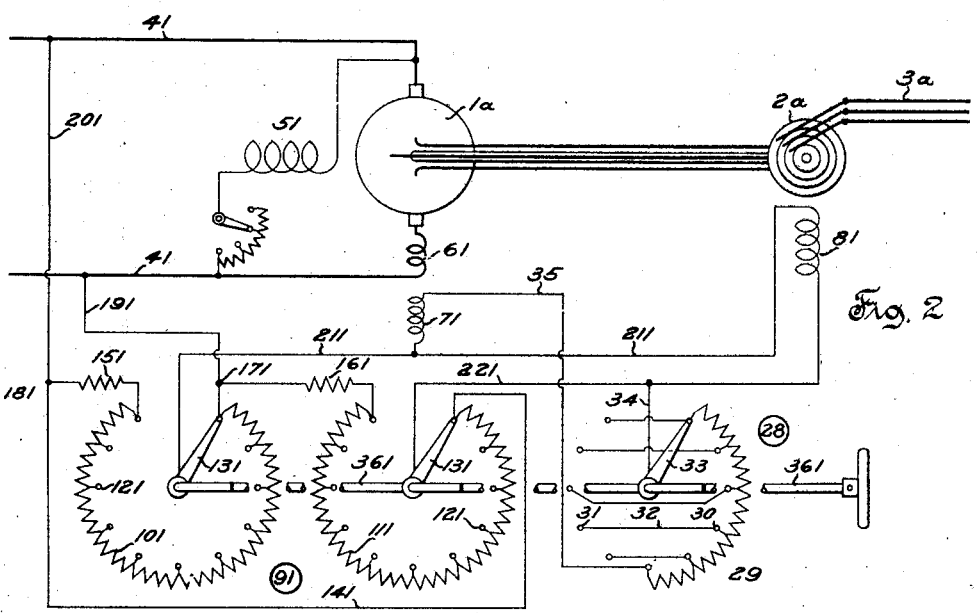
Fig. 2 is a diagram showing a modification of the invention.

It is not necessary, however, that the difference in characteristic curves of the booster field and the shunt interpole field be taken care of by the rheostat 23 as shown in Fig. 1. This may be accomplished by a different type of rheostat, connected in series with the shunt interpole field 71, as shown in Fig. 2. The shunt interpole rheostat 28 comprises the resistor 29 having taps and contacts 30 of any desirable number connected thereto, each of the contacts 30 being connected to a corresponding contact 31 opposite the same, by means of a cross conductor 32. The rheostat is provided with a movable contact arm 33 which is connected by conductor 34 to conductor 22. One end of the resistor 29 is connected by conductor 35 to one terminal of the shunt interpole field 71 the other terminal of which is connected to the conductor 211. With the contact arms 131 in the position of maximum buck the contact arm 33 is so arranged as to include all of the resistor 29 in circuit with the shunt interpole field 71. The inclusion of the resistor 29 compensates for the difference in applied voltage necessary to produce a given flux in the shunt interpole field as compared to the booster field. As the applied voltage, however, is reduced in consequence of the clockwise rotation of the contact arms 131 the difference in applied voltage necessary becomes less and less by reason of the fact that the booster field is now approaching the straight line portion of its characteristic curve. This condition is compensated for by the rotation of the contact arm 33 which gradually removes resistance from the circuit of the shunt interpole field. When the voltage across the arms 131 reverses its direction and gradually again rises as rotation is continued the resistor 29 must be again gradually inserted and this is accomplished by the auxiliary contacts 31.

It is apparent that it is not absolutely essential that the rheostats 9 and 23 of Fig. 1 be mechanically coupled as they may be independently set in the proper positions by an operator, but it is more convenient to have them operate in unison in some manner and this may be easily accomplished by a single shaft 36. The same is true with respect to the rheostats 9 and 28 of Fig. 2.

It should be understood that it is not desired that the invention claimed be limited to the exact details shown and described, for obvious modifications will occur to a person skilled in the art.

It is claimed and desired to secure by Letters Patent:

1. In combination, a dynamo-electric machine, a booster in circuit therewith, a commutating field winding for said machine, a field winding for said booster, current controlling means for said field windings, and means for relatively further modifying the current supply to the booster field winding and said commutating winding to compensate for the difference in characteristic curves of said fields.

2. In combination, a dynamo-electric machine, a booster in circuit therewith, a commutating field winding for said machine, a field winding for said booster, current controlling means for said field windings, and means for relatively varying the resistance in the booster field winding and said commutating winding, operatively related to said current controlling means to compensate for the difference in characteristic curves of said fields.

3. In combination, a dynamo-electric machine, a booster in circuit therewith, a field winding for said machine, a field winding for said booster, current controlling means for said field windings, and means for varying the resistance in the booster field winding in unison with said current controlling means.

4. In combination, a dynamo-electric machine, a booster in circuit therewith, a field winding for said machine, a field winding for said booster, current controlling means for said field windings, and a rheostat for controlling the booster field winding coupled with said current controlling means, having two limiting positions in which the resistance is all cut out and between which it is all cut in.

5. In combination, a dynamo-electric machine for supplying direct current, a booster in circuit therewith, a field winding for said booster, a field winding for said machine, a reversible potentiometer rheostat comprising two main resistors adapted to be connected together in a closed loop, two coupled movable contact arms for cooperating with said main resistors, two fixed resistors forming the junctions between said main resistors, means for connecting the point of connection between one main resistor and one fixed resistor to one pole of the direct current supply, means for connecting the point of connection between the other main resistor and the other fixed resistor to the other pole of the direct current supply, means for connecting the booster field winding and the machine field winding to the said movable arms, and a rheostat for controlling the booster field winding, coupled with said arms, having two limiting positions in which the resistance is all cut out and between which it is all cut in.

6. In combination, a dynamo-electric machine, a booster in circuit therewith having a field winding, a field winding for said machine, means for furnishing a variable supply of current to said fields, and means for compensating for the difference between the characteristic curves of said fields.

7. In combination, a dynamo-electric machine, a booster in circuit therewith having a field winding, a field winding for said machine, reversible means for furnishing a variable supply of current to said fields, and means for compensating for the difference between the characteristic curves of said fields.

8. In combination, a dynamo-electric machine for supplying direct current, a booster in circuit therewith, having a field winding, a field winding for said machine, reversible means for furnishing a variable supply of current to said fields, means for compensating for the difference between the characteristic curves of said fields and means for causing the maxima of the variable-current voltages to be substantially the same.

9. In combination, a dynamo-electric machine for supplying direct current, a booster in circuit therewith, a field winding for said booster, a field winding for said machine, a reversible potentiometer rheostat comprising two main resistors adapted to be connected together in a closed loop, two coupled movable contact arms for cooperating with said main resistors, means for connecting the points of connection between the main resistors to the poles of the direct current supply, means for connecting the booster field winding and the machine field winding to the said movable arms, and a rheostat for controlling the booster field winding, coupled with said arms, having two limiting positions in which the resistance is all cut out and between which it is all cut in.

10. In combination, a dynamo-electric machine, a booster in circuit therewith having a field winding, a field winding for said machine, means for furnishing a variable supply of current to said fields, and means operatively related to said variable supply means for compensating for the difference between the characteristic curves of said fields.

In testimony whereof, the signature of the inventor is affixed hereto.

WILLIAM H. POWELL.